(12) United States Patent
Jensen et al.

(10) Patent No.: US 6,855,773 B1
(45) Date of Patent: Feb. 15, 2005

(54) POLYMER-BASED SURFACTANTS AND INTERFACIAL MODIFIER MATERIALS

(75) Inventors: Robert E. Jensen, Newark, DE (US); Matthew S. Bratcher, Aberdeen, MD (US); Steven H. McKnight, Newark, DE (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 10/318,300

(22) Filed: Dec. 13, 2002

(51) Int. Cl.⁷ .......................... C08F 259/08; C08L 51/00
(52) U.S. Cl. ....................... 525/276; 525/302; 525/309; 525/71; 525/60
(58) Field of Search ................................. 525/276, 302, 525/309, 60, 71

(56) References Cited

U.S. PATENT DOCUMENTS

| | | | |
|---|---|---|---|
| 5,567,372 A | 10/1996 | Nohr et al. | 264/103 |
| 5,569,732 A | 10/1996 | Nohr et al. | 528/27 |
| 5,620,788 A | 4/1997 | Garavaglia et al. | 442/118 |
| 5,731,095 A | 3/1998 | Milco et al. | 428/482 |
| 5,853,883 A | 12/1998 | Nohr et al. | 428/391 |
| 5,854,147 A | 12/1998 | Nohr et al. | 442/123 |
| 6,444,758 B2 * | 9/2002 | McNamara et al. | 525/302 |

* cited by examiner

Primary Examiner—James J. Seidleck
Assistant Examiner—Olga Asinovsky
(74) Attorney, Agent, or Firm—William Randolph

(57) ABSTRACT

Methods and systems for modifying a polymer are disclosed herein. A solution is generally provided having a surface thereof, wherein the solution comprises a plurality of highly branched polymers. The plurality of highly branched polymers can be chemically bound to a plurality of surfactants or order to modify the surface and produce a polymeric material thereof. The surface is tailored with a plurality of functional groups that self-assemble and are deliverable to the surface of the solution, including interfaces thereof, thereby permitting a high-density assembly of functional groups to operate in concert with one another in order to generate a modified surface thereof. The polymeric material produced thereof can be reversibly adaptable to environmental conditions through a blooming of varying surface functional group to the surface of the solution.

8 Claims, 2 Drawing Sheets

POLYMER-BASED SURFACTANTS AND INTERFACIAL MODIFIER MATERIALS

STATEMENT OF GOVERNMENT INTEREST

The invention described herein may be manufactured and used by or for the United States Government for Governmental purposes without the payment of any royalties.

TECHNICAL FIELD

The present invention generally to polymers and polymer modification schemes thereof. The present invention also relates to highly branched polymers and multiple functional chemical groups and compounds thereof. The present invention also relates to self-decontaminating techniques and chemical compounds thereof.

BACKGROUND OF THE INVENTION

Technologies for modifying polymers are well known. Some polymer modification systems, for example, allow one to modify a polymer with ammonium salts, such that the ammonium salts will migrate to the surface. This has only been demonstrated with unbranched copolymer siloxane systems, which are different material than what is claimed in this invention. Prior art technologies generally rely upon standard linear polymers and copolymers.

For example, U.S. Pat. No. 5,567,372, "Method for Preparing a Nonwoven Web Containing Antimicrobial Siloxane Quaternary Ammonium Salts," which issued to Nohr et al on Oct. 22, 1996, generally discloses a method for preparing a nonwoven web having antimicrobial properties which involves melting a melt-extrudable thermoplastic composition, extruding the molten composition through multiple orifices to form streams of molten composition, cooling the streams of molten composition to form fibers, and randomly depositing the fibers on a moving surface to form a web. The thermoplastic composition includes a thermoplastic material and an additive. The additive is an antimicrobial siloxane quaternary ammonium salt.

On the other hand, U.S. Pat. No. 5,620,788, "Wettable Polymeric Fabrics with Durable Surfactant Treatment", which issued to Garavaglia et al on Apr. 15, 1997, discloses a polymeric fabric having enhanced wettability, a method for producing such wettable polymeric fabric, and a composition for use in the method. In one embodiment, the fabric includes a succinate surfactant substantially uniformly distributed on the surface of the fabric. The succinate surfactant is applied with a co-wetting aid, which reduces the surface tension of the surfactant composition. In another embodiment, the polymeric fabric comprises multiple surfactants on the surface of the polymeric fabric.

Additionally, U.S. Pat. No. 5,569,732, "Antimicrobial Siloxane Quaternary Ammonium Salts" which issued to Nohr et al describes a siloxane quaternary ammonium salt, which can be either of two general classes: (1) a trisiloxane having a pendent quaternary ammonium group and a molecular weight of from about 600 g/mol to about 1,700 g/mol; and (2) an ABA-type siloxane having a polydispersity of up to about 3.0 and a weight-average molecular weight of from about 800 g/mol to about 2,000 g/mol, in which a central siloxane moiety is terminated at each end by a quaternary ammonium salt group. The invention disclosed in U.S. Pat. No. 5,569,732 is generally directed toward the goal of providing a compound to be included as an additive in a thermoplastic composition for the preparation of antimicrobial nonwoven webs.

Other technologies exist whereby dendritic polymers have been used for coating applications. These materials are dendritic polymers with at least one anionic terminal group and a water-dispersible fluorine-containing component. Although a wide variety of polymer materials may be used, including polyester, polythioethers, and polyarylalkylenes, amine containing polymers are not acceptable materials for this application due to the fact that the high basicity interferes with the oxazoline polymer chemistry that forms the basis of their claims. A dendritic polymer coating, for example, is described in U.S. Pat. No. 5,731,095, "Dendritic Polymer Coatings," which issued to Milco et al on Mar. 24, 1998. Milco et al discloses a water-soluble or water-dispersible fluorine-containing dendritic polymer surfactant having at least one terminal fluorocarbon moiety and at least one terminal anionic moiety. Such dendritic polymer coatings are apparently suitable for use in preparing protective coating compositions.

Currently, materials exist that can permit surface functional groups to be tailored by allowing equilibrium to drive the groups to the air interface. For example, it has been demonstrated that fluorinated groups can migrate to the surface and that under the same fluorine concentration, branching points in the polymer chain amplify the energetic interactions such that more fluorine is driven to the surface. To date, however, an extension to more highly branched systems has not been made or proposed.

Prior art technologies have been plagued with problems including high surfactant concentrations that can complicate processing and are inefficient, along with surface treatments that deposit functional groups of interest. Prior technologies do not provide a means of covalently linking the additive to the substrate. Furthermore, such prior art technologies also do not offer proper post-processing treatments.

Based on the foregoing, the present inventors have concluded that a need exists for a pre-organized chemical architecture that makes a greater and more efficient use of additives, thereby reducing the concentration required to observe migration to the surface during polymer surface modification procedures. The present inventors have also concluded that a need exists for polymer surfaces, which are stimuli-responsive to different environments, thereby causing different functional groups to migrate to the surface of such polymers.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

It is, therefore, one aspect of the present invention to provide a unique class of polymeric materials.

It is yet another aspect of the present invention to provide methods and systems for binding highly branched polymers to surfactants.

It is also an aspect of the present invention to provide an improved chemical architectural design wherein chemical functional groups are assembled at the molecular level in high local concentrations.

It is still another aspect of the present invention to provide a highly branched chemical architecture approach wherein a high local concentration of groups brings many groups to the surface of a polymer-based solution.

It is also an aspect of the present invention to provide methods and systems for promoting the switchability of polymer surface groups without disrupting the bulk of the polymer matrix thereof.

The above and other aspects can be achieved as is now described. Methods and systems for modifying a polymer are disclosed herein. A solution can be provided having a surface thereof, wherein the solution comprises a plurality of highly branched polymers. The plurality of highly branched polymers can be chemically bound to a plurality of surfactants in order to modify the surface and produce a polymeric material thereof. The surface is tailored with a plurality of functional groups that self-assemble and are deliverable to the surface of the solution, including interfaces thereof, thereby permitting a high-density assembly of functional groups to operate in concert with one another in order to generate a modified surface thereof. The polymeric material produced thereof is reversibly adaptable to environmental conditions through a blooming of varying surface functional group to the surface of the solution, which is described in greater detail herein.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

DETAILED DESCRIPTION OF THE INVENTION

The particular values and configurations discussed in these nonlimiting examples can be varied and are cited merely to illustrate embodiments of the present invention and are not intended to limit the scope of the invention.

The present invention is directed toward a unique class of polymeric materials. These materials have two key features. The first feature comprises an efficient architectural design, whereby chemical functional groups are assembled at the molecular level and in high local concentrations. The materials utilized to create this chemical architecture can be commercially available highly branched polymers, which are available with a variety of different functional groups. According to invention described herein, the properties of the functional groups become amplified relative to materials with the same concentration of functional groups distributed uniformly throughout the material. These domains of dense functional groups "bloom" to the surface as a result of these strong interactions. By using this approach, far less additive has to be used. Note that that the term "bloom" or "blooming" is well known in the chemical arts and refers generally to a forced rising of particles or chemical compounds and elements to a surface through chemical interactions thereof.

The second feature of such polymeric materials is that the surfaces of these materials can adapt to the environment by switching the exposed functional groups in order to optimize surface-environment interactions. This switching function can be envisioned as a "fli-flop" of functional groups, whereby one group buries itself while the preferred group migrates to the surface of the polymer or polymer-based solution. The key component here is in the molecular architecture that simultaneously increases surfactant efficiency and permits "delivery" of one or more chemical functionalities to the surface and/or interface.

Figure 1:
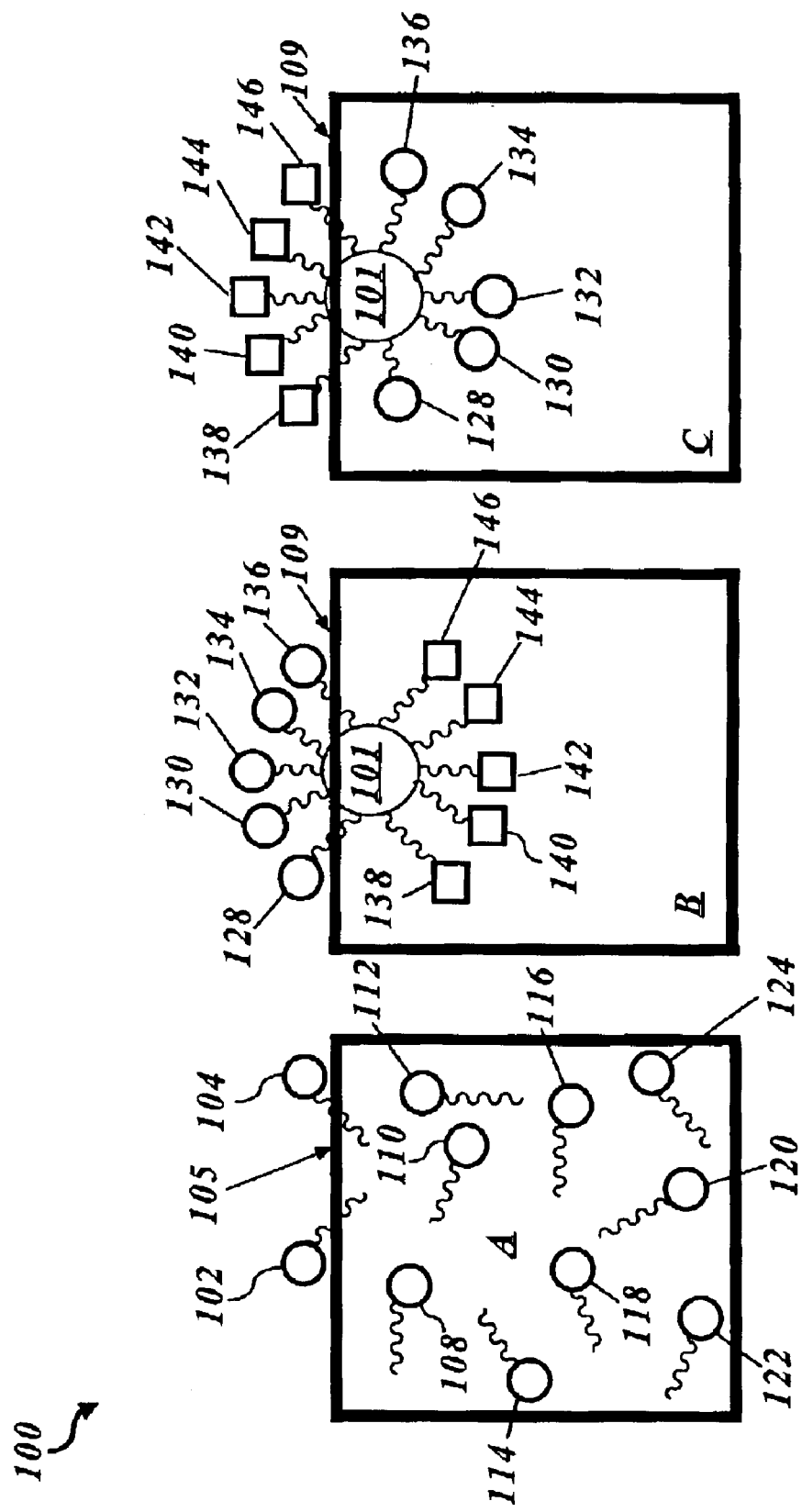
FIG. 1 illustrates a block diagram depicting an adaptive polymer with fluorinated and hydrophilic groups, in accordance with a preferred embodiment of the present invention.

FIG. 1 illustrates a block diagram 100 depicting an adaptive polymer with fluorinated and hydrophilic groups. In FIG. 1, there schemes are illustrated including a scheme A, which illustrates a polymer doped with a fluorinated surfactant wherein only a small amount of the polymer rises to the surface 105, beneath which lies a plurality of fluorinated groups 108, 110, 112, 114, 116, 118, 120, 122 and 124. Only a few fluorinated groups 102 and 104 rise to surface 105 according to scheme A. Scheme A represents a traditional method. Scheme B, on the other hand, illustrates a highly branched chemical architectural approach, which can be implemented in accordance with the present invention, such that a high local concentration of groups brings many groups to the surface 109, including a plurality of fluorinated groups 128, 130, 132, 134, and 136, and a plurality of hydrophilic groups 138, 140, 142, 144, and 146, which are joined via a chemical bond 101. Note that surface 109 of scheme B is analogous to surface 105 of scheme A.

Scheme C depicts another feature of the present invention, which illustrates the switchability of the surface groups without disrupting the bulk of the polymer matrix. Note that in both scheme B and scheme C of FIG. 1, like or analogous parts are generally represented by identical reference numerals. Also, in schemes A, B, and C of FIG. 1, circular shapes generally represent fluorinated groups, while square shapes generally represent hydrophilic groups. Note that as utilized herein the term "polymer" generally refers to compounds with very large molecules made up of repeating molecular units. Thus, based on the configuration depicted in FIG. 1, it can be appreciated that the properties of the functional groups become amplified relative to materials with the same concentration of functional groups distributed uniformly throughout the materials. These domains of dense functional groups "bloom" to the surface 109 as a result of these strong interactions. By using this approach, far less additive has to be utilized. As indicated in scheme C of FIG. 1, surfaces such as surface 109 can adapt to the environment by switching the exposed functional groups in order to optimize surface environment interactions.

Preliminary proofs of concept experiments can be carried out, which clearly demonstrate the surface activity and switchability potential of fluorinated dendritic polymer additives. Water can be utilized to probe the contact angle, hence surface free energies, of cured vinyl ester resin as a function of concentration of fluoro-additive. To establish a baseline response Dupont Zonyl™ fluoro-surfactant (methacryl functional) can be added to Dow Derakane 411-C-350 vinyl ester resin in weight percentages ranging from, for example, approximately 0.0% to 9.6%. The resultant advancing and receding contact angle of water on the surface of the vinyl ester changes very little as the concentration of fluoro-surfactant is increased (e.g., 62.3° advancing and 42.0° receding).

To increase the activity of the fluorinated surfactant the Zonyl™ can be chemically bonded to a commercial BASF Lupasol amine functional dendrimer via an additional reaction between the methacryl groups of the Zonyl™ and the amine groups of the Lupasol prior to the incorporation into the vinyl ester resin. Note that although the present invention is discussed in the context of a vinyl ester resin, it can be appreciated by those skilled in the art that the technology described herein can apply to any polymeric, oligomeric thermoset, and/or thermoplastic material. Thus, a vinyl ester resin can be replaced with, for example, any polymeric, oligomeric thermoset, and/or thermoplastic material. The use of a vinyl ester resin is described here for general illustrative purposes only.

Figure 2:
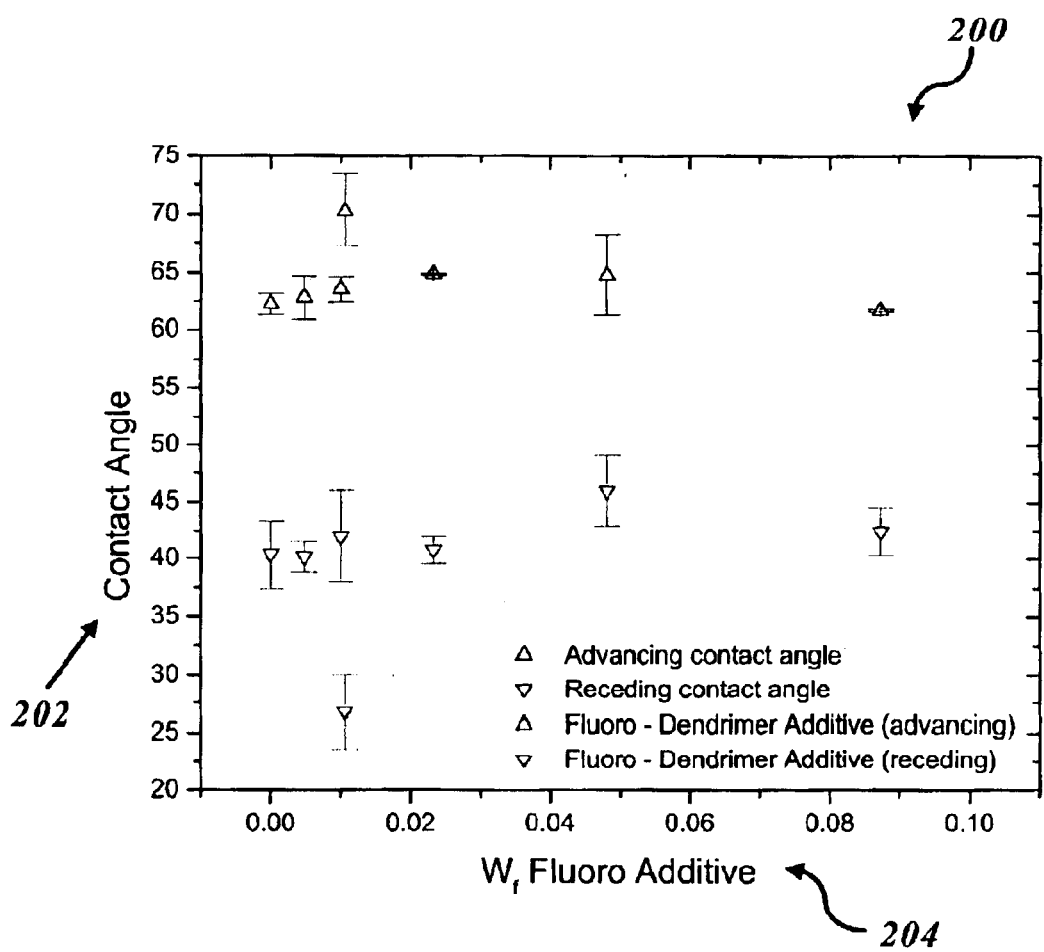
FIG. 2 depicts a graph illustrating a summary of contact angle results, which illustrate increased surface activity of a fluoro-surfactant when bonded to the pendant groups of a polymeric dendrimer, in accordance with a preferred embodiment of the present invention.

An additional reactive product can thus be added to the vinyl ester resin to yield a concentration of, for example, 1.5 wt. % Lupasol (i.e., functional group) pre-reacted with 1.0 wt. % Zonyl™. The change in the advancing and receding contact angles can be dramatic. The advancing contact angle can increase from 62.3° to 70.3°, due to the hydrophobic nature of fluorine, and the receding contact angle can decrease from 42.0° to 26.8°, presumably due to the surface fluorine groups switching to the more energetically favorable and hydrophilic unreacted amine groups of the Lupasol dendrimer. It should also be noted that the addition of 1.5 wt. % Lupasol to the vinyl ester resin will generally not affect either the advancing or receding contact angle. A summary of preliminary contact angle data is displayed in FIG. 2, which depicts a graph 200 illustrating a summary of contact angle results, which demonstrate increased surface activity of a fluoro-surfactant when bonded to the pendant groups of a polymeric dendrimer. Graph 200 thus represents a plot of contact angle values along a y-axis 202 versus fluoro-additive values along an x-axis 204.

Based on the foregoing it can be appreciated that the present invention generally describes methods and systems for modifying a polymer are disclosed herein. According to such methods and systems, a solution can be generally provided having a surface thereof, in which the solution comprises a plurality of highly branched polymers. The plurality of highly branched polymers can be chemically bound to a plurality of surfactants in order to modify the surface and produce a polymeric material thereof. The surface can be tailored with a plurality of functional groups that self-assemble and are deliverable to the surface of the solution, including interfaces thereof, thereby permitting a high-density assembly of functional groups to operate in concert with one another in order to generate a modified surface thereof. The polymeric material produced thereof can be reversibly adaptable to environmental conditions through a blooming of varying surface functional group to the surface of the solution.

The present invention offers a number of advantages over the prior art. As indicated previously, technology has been developed which allows one to modify a polymer with ammonium salts in order to permit the ammonium salts will migrate to the surface. This has only been demonstrated with unbranched copolymer siloxane systems, which comprise materials different than that of the present invention. Prior art technologies additionally rely on standard linear polymers and copolymers, whereas the present invention is particularly based on branched or highly branched polymer architectures. Therefore, not only can the materials differ by composition, but also by structure. The present invention described herein also possess the ability to change functional groups at the surface, wherein such changes are environmentally induced (i.e. solvent exposure, humidity, etc). The unique class of polymeric materials of the present invention can also be adapted for use as self-decontaminating materials for textiles and films, seeds for catalysts, catalytic sites, and chemical separation and membranes.

Also, as indicated previously, some technologies utilize dendritic polymers for coating applications. These materials are dendritic polymers with at least one anionic terminal group and a water-dispersible fluorine-containing component. Although a wide variety of polymer materials can be used, including polyester, polythioethers, and polyarylalkylenes, amine containing polymers are not acceptable materials for the present application due to the fact that the high basicity interferes with the oxazoline polymer chemistry. Thus, in accordance with the invention described herein, the dendritic polymer can be an amine-containing polymer, which is compatible and does not rely on the specific oxazoline chemistry required by the prior art.

As indicated previously, prior art technologies are plagued with problems including 1) high surfactant concentrations that can complicate processing and are less efficient than those described in this invention, 2) surface treatments to deposit functional groups of interest may not provide a means of covalently linking the additive to the substrate resulting in a temporary effect, 3) post-processing treatments add an additional procedure whereas this invention allows one to create the preferred surface by simply tuning composition of the initial materials. Thus, the invention described herein represents a significant advancement in that 1) the pre-organized architecture makes more efficient use of the additive thereby reducing the concentration required to observe migration to the surface and 2) the surfaces in the present invention are stimuli-responsive such that different environments can cause different functional groups to migrate to the surface.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered. The description as set forth is not intended to be exhaustive or to limit the scope of the invention. Many modifications and variations are possible in light of the above teaching without departing from the scope of the following claims. It is contemplated that the use of the present invention can involve components having different characteristics. It is also intended that the scope of the present invention be defined by the claims appended hereto, giving full cognizance to equivalents in all respects.

The embodiments of an invention in which an exclusive property or right is claimed are defined as follows:

1. A system containing functional groups that are switchable between different orientations, comprising:

dendrimer polymers suspended at the surface of a solution of at least one of a polymeric material, an oligomeric thermoset material, and a thermoplastic material;

hydrophilic functional groups attached to the dendrimer polymers; and hydrophobic functional groups attached to the dendrimer polymers, wherein introduction of water into the solution produces migration of the hydrophilic functional groups attached to a dendrimer about the dendrimer so they are positioned generally at or above the surface of the solution and migration of the hydrophobic functional groups attached to a dendrimer so that they are positioned generally below the surface of the solution.

2. The system of claim 1, wherein the hydrophilic functional groups are amines and the hydrophobic functional groups are fluorinated.

3. The system of claim 1, wherein the hydrophilic functional groups are amines and the hydrophobic functional groups are fluoro-surfactants.

4. A solution consisting essentially of:
   dendritic polymers suspended in at least one of a polymeric material, an oligomeric thermoset material, and a thermoplastic material;
   amine functional groups attached to the dendritic polymers; and
   a fluorosurfactant nt attached to the dendritic polymers.

5. A method for modifying functional groups attached to a dendrimer polymer suspended at the surface of a solution including at least one of a polymeric material, an oligomeric thermoset material, and a thermoplastic material, wherein the dendrimer has at least one hydrophilic functional group and at least one hydrophobic functional group attached to the dendrimer, comprising the step(s) of:
   hydrating the solution, for producing migration of the hydrophilic functional groups attached to a particular dendrimer about the dendrimer so they are positioned generally at or above the surface of the solution and migration of the hydrophobic functional groups attached to the dendrimer so that they are positioned generally below the surface of the solution.

6. The method of claim 5, further comprising:
   selective dehydrating the solution, for producing migration of the hydrophobic functional groups attached to the dendrimer so they are positioned generally at or above the surface of the solution and migration of the hydrophilic functional groups attached to the dendrimer so they are positioned generally below the surface of the solution.

7. The method of claim 5, wherein the hydrophilic functional group comprises an amine and the hydrophobic functional group comprises a fluorinated functional group.

8. The method of claim 5, wherein the hydrophilic functional groups are amines and the hydrophobic functional groups are fluor-surfactants.

* * * * *